United States Patent
Reznicek

[11] 3,735,882
[45] May 29, 1973

[54] SUPPORTING AND POSITIONING DOLLY FOR DUAL WHEELS

[76] Inventor: Frank Reznicek, 1412 7th Street, Columbus, Nebr. 68601

[22] Filed: July 14, 1971

[21] Appl. No.: 145,453

[52] U.S. Cl. ............................................. 214/332
[51] Int. Cl. ......................................... B60b 29/00
[58] Field of Search .................... 214/330, 331, 332, 214/333, 390

[56] References Cited
UNITED STATES PATENTS
2,362,981  11/1944  Baum ................................. 214/332
2,476,493  7/1949   Johnson ............................. 214/332

*Primary Examiner*—Gerald M. Forlenza
*Assistant Examiner*—Lawrence J. Oresky
*Attorney*—Clarence A. O'Brien and Harvey B. Jacobson

[57] ABSTRACT

A dual wheel assembly handling dolly for use by a single workman, constructed to supportively cradle, transport and position the assembly whether removing or applying the same. It comprises a knockdown roller supported U-frame, a pivoted manually maneuverable detachable sectional handle and wheel contacting adapter plates. A first adapter plate is seated and adjustably bolted atop one leg of the frame. The second adapter plate is spaced from and parallel with the first plate, is hingedly mounted on the other leg, sloped inwardly and downwardly and is provided at a rearward transverse end with a right angled lever. This lever has a hand-grip and is provided with a slidingly mounted cleat which provides a lever propping chock and is adjustably engageable with the bight portion of the frame.

7 Claims, 6 Drawing Figures

PATENTED MAY 29 1973 3,735,882

Frank Reznicek
INVENTOR.

BY *Clarence A. O'Brien*
*and Harvey B. Jackson*
Attorneys

SUPPORTING AND POSITIONING DOLLY FOR DUAL WHEELS

This invention relates to manually maneuverable mobile trucks which are commonly used by a single workman when he is called upon to mount or demount heavy dual wheel assemblies, and pertains to an improved adaptation herein designated as a wheel cradling, transporting and handling dolly.

More specifically, the invention herein disclosed has to do with a structurally and functionally novel U-shaped frame, that is, a frame characterized by separable and connectible component parts, the opposed legs being provided with novelly constructed adapter plates, one normally stationary and one relatively movable, and handle means of a sectional attachable and detachable type.

For general background information, it may well be stated that the dolly herein revealed is an improvement, broadly speaking, on my prior U.S. Pat. No. 3,463,337 covering a Wheel Assembly Supporting and Positioning Cart and which is likewise characterized by a manually controllable mobile frame embodying a yoke with spaced arms or legs, having push-pull handle means, but which is otherwise structurally distinct and different.

More explicitly and for further background information the reader, if so desired, may refer to the dual wheel handling and lifting wheel supported device disclosed in a patent granted to George M. Olsen, U.S. Pat. No. 2,231,192 and a U-frame type so-called wheel lift disclosed in Harris L. Molden, et al., U.S. Pat. No. 3,301,419. These reference patents are cited here as exemplary, broadly stated, of the art to which the invention relates.

Briefly the invention is characterized by a wheel assembly cradling, transporting and positioning dolly comprising a manually maneuverable frame which is U-shaped in plan and embodies a pair of spaced parallel coplanar legs having forward ends provided with free turning surface contacting rollers and rearward ends joined together by an intervening bight portion. A median part of this bight portion is provided on an underneath side with a balanced, that is, centralized swivelly mounted surface contacting caster, more particularly, a caster which is oriented and coordinated with the forward rollers. A push-pull handle has a forward end operatively joined to a median portion of the bight portion and a rearward end which is provided with balanced handgrips. A first adapter plate is carried by one of the legs and has an inward longitudinal edge on which minimal surface portions of the wheel tires of the wheel assembly are adapted to supportively rest. A second adapter plate is cooperate with the first adapter plate and is carried by the other leg of the frame. The second adapter plate has an upper flat surface atop which the tread portions of the tires are adapted to rest in a manner that the overall wheel assembly can be cradled for handling needs on the frame.

In carrying out the principles of the invention the first adapter plate is seated and adjustably mounted atop the leg with which it is cooperable, and, in fact, is commensurate in length with that particular leg. The inward longitudinal edge is shiftably adjustable toward and from the second adapter plate. The second adapter plate is equal in length to the first adapter plate, has an outward longitudinal edge which is hingedly supported and an inward longitudinal edge which is swingable vertically relative to the stationary longitudinal inner edge of the first adapter plate.

Then, too, novelty is predicted on providing the hinged adapter plate with a lifting and lowering lever whose longitudinal axis is disposed at right angles to the lengthwise dimension of the second adapter plate. The lever is parallel with and proximal to the bight portion of the U-frame and has one end fixed to a rearward end portion of the second adapter plate and the other end free and provided with a lifting and lowering handle and a slidingly mounted cleat which serves as a lever-angle regulating and maintaining chock.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
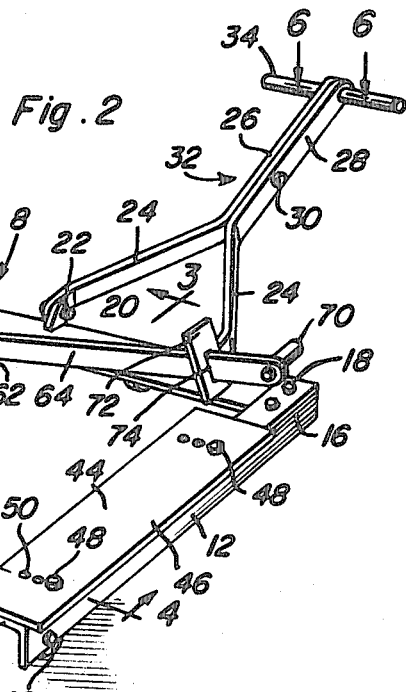
FIG. 2 is a view in perspective of the dolly by itself with the wheel assembly omitted.

With reference to the views singly and collectively and particularly to FIG. 2, the aforementioned knockdown U-shaped frame is denoted by the numeral 8 and comprises three complemental angle irons which conjointly provide a pair of spaced parallel coplanar legs and an intervening and connecting bight portion. One leg, a simple angle iron is denoted at the left in FIG. 2 by the numeral 10. The other angle iron leg is denoted at the right by the numeral 12. The connecting angle iron, which constitutes the aforementioned bight portion is denoted by the numeral 14. It will also be observed that the rearward end portions of the legs or angle irons 10 and 12, that is, the ends 16 are separably bolted as at 18 to the coacting end portions of the angle iron 14. The top flange of the angle iron 14 is provided with upstanding lugs 20 which serve to accommodate bolts 22 which, in turn, connect the diverging forward ends 24 of the handle sections 26 and 28. These handle sections are separably bolted together at 30 and the parts when assembled provide an appropriate detachably and pivotally mounted handle 32. The handlegrips are denoted at 34.

The thus constructed U-frame 8 is of knock-down construction and preferably made up of coacting angle irons as shown. Brackets 38 (FIG. 2) mounted on the respective transverse end portions of the vertical flange of the angle iron 10 are provided and serve the purpose shown. Rearwardly of these brackets free-turning forward rollers or wheels 40 are provided. These two wheels 40 cooperate with the swivelly mounted caster wheel 42 which is centrally positioned thus providing a wheel supported knock-down frame and a sectional knock-down push-pull handle.

The means on which the tread portions of the wheels of the wheel assembly A are mounted are carried by the respective angle iron legs 10 and 12. Referring first to the angle iron 12, in FIGS. 2 and 4, for example, the numeral 44 designates a rectangular flat-faced first adapter plate, that is a plate which is commensurate in length with the leg 12 but is of a width greater than the top flange of the leg, the outer edge portion 46 resting atop the leg flange and being separably and adjustably bolted thereto as at 48. Bolt holes 50 are provided for adjustment needs. The inner edge portion 52 overhangs the top flange 54 in FIG. 2 in a manner to support a minimal tread portion of the tires as brought out in phantom lines in FIG. 4.

Figure 3:
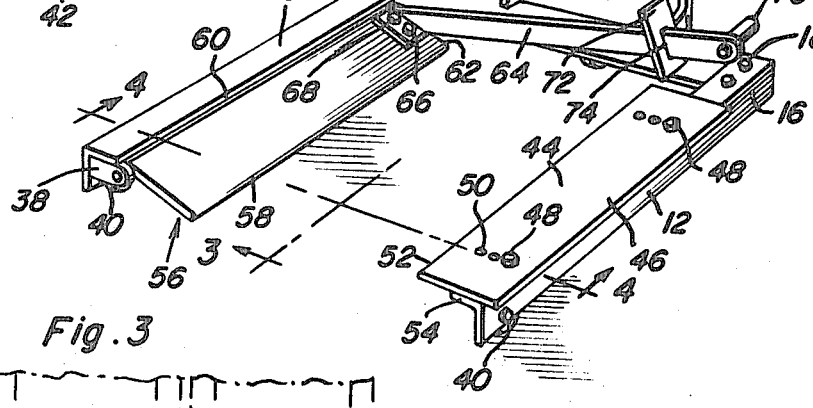
FIG. 3 is a central longitudinal section on a suitably enlarged scale with parts in section and elevation taken approximately on the plane of the central section line 3—3 of FIG. 2 looking in the direction of the indicating arrows.
Figure 4:
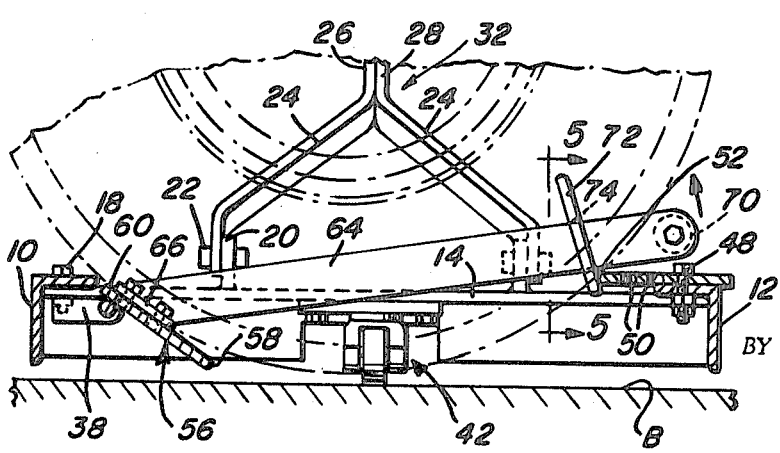
FIG. 4 is a view at right angles to FIG. 3 taken on the plane of the section line 4—4 of FIG. 2.

The second oriented and coordinating adapter plate instead of occupying a horizontal plane normally assumes an inwardly and downwardly inclined position and is denoted by the numeral 56. The lower lengthwise or longitudinal edge 58 is adjacent and approximately parallel to the support surface B (FIGS. 3 and 4). The upper longitudinal edge 60 has suitable journals which are journaled for rotation in the bearing brackets 38. The rearward transverse edge of this liftable and lowerable adapter plate is provided with a rigid lifting and lowering lever 64 having one end portion 66 bolted at 68 atop the plate 56. The lever is disposed at right angles to the lengthwise dimension of the plate 56 and is parallel to a forward edge portion of the bight portion 14. The free end of the lever is provided with an appropriate handgrip 70. This handle-equipped portion serves to accommodate a cleat which is centrally apertured as at 74 and this cleat, in turn, serves as a chock and can be slid along the top flange of the angle iron 14 to prop the hinged adapter plate in the position desired to facilitate lifting and lowering the wheel assembly A.

Figure 1:
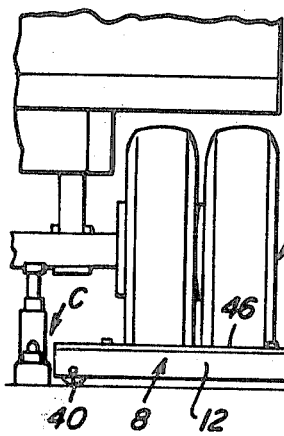
FIG. 1 is a view on a relatively small scale showing jack-supported dual wheels on a vehicle and also showing the dolly in position for either applying or removing the wheels as the case may be.

In practice the wheel assembly A is elevated by a jack C in the manner shown in FIG. 1. Thus elevated the adapter-equipped arms or legs 10 and 12 can straddle the tread portions of the dual tires. The handle means 32 is maneuverable to actuate the thus constructed mobile carriage or dolly. The adapter plate 44 can be shiftably adjusted in any suitable manner. The companion adapter plate 56 is properly cooperable and is liftable and lowerable to receive segmental portions of the tires in the manner shown in phantom lines for example in FIGS. 3 and 4. The chock 72 serves to hold the lever in an elevated position and also the hinged adapter plate in what is believed to be a self-evident manner.

Emphasis is placed on the construction of the truck or frame 8 of separable and connectible angle irons. Also for convenience and compactness the handle means 32 is of sectional and knock-down and detachable construction.

Figure 6:
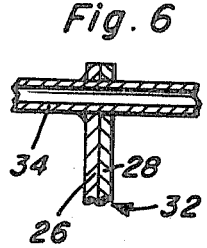
FIG. 6 is a detail section on a suitably enlarged scale taken on the plane of the section line 6—6 of FIG. 2.
Figure 5:
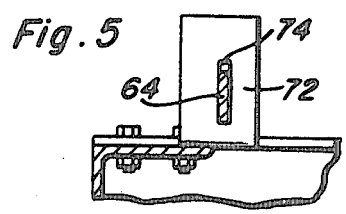
FIG. 5 is a detail section on the plane of the section line 5—5 of FIG. 4.

FIG. 5 shows the supportive feature of the chock cooperating with the top flange of the bight portion 14. FIG. 6 shows the manner in which the separable and connectible section of the handle is associated with the handgrip means.

It is submitted that a careful consideration of the views of the drawing in conjunction with the specification and the invention as claimed will enable the reader to obtain a complete and comprehensive understanding of the invention, features and advantages, and manner of use. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For ready handling by a single workman, a dual vehicle wheel cradling, transporting and positioning dolly comprising, in combination, a manually maneuverable frame U-shaped in plan and embodying a pair of spaced parallel coplanar legs having forward ends provided with free turning surface contacting rollers and rearward ends joined together by an intervening bight portion, a median portion of said bight portion being provided on an underneath side with a swivelly mounted surface contacting caster which is oriented and coordinated with said roller, a push-pull handle having a forward end operably joined to the median portion of said bight portion and a rearward end provided with balanced handgrips, a first adapter plate carried by one of said legs and having an inward longitudinal edge on which minimal surface portions of the wheel tires are adapted to rest, a second adapter plate cooperating with said first adapter plate and carried by the other leg, said second adapter plate having an upper flat surface atop which tread portions of said tires are adapted to rest in a manner that the overall wheel assembly can be cradled for handling needs on said frame, said first adapter plate being adjustably mounted on said one leg, commensurate in length with said one leg, said inward longitudinal edge being shiftably adjustable toward and from said second adapter plate, said second adapter plate being equal in length to the length of said first adapter plate and also said other leg, and having an outward longitudinal edge which is hingedly supported and an inward longitudinal edge which is swingable vertically relative to the inward longitudinal edge of said first adapter plate, and a lifting and lowering lever whose longitudinal axis is disposed at right angles to the lengthwise dimension of said second adapter plate, said lever being parallel and proximal to said bight portion and having one end fixed to a rearward end portion of said second adapter plate and the other end free and provided with an accessible handgrip.

2. The dolly defined in and according to claim 1, and wherein a cleat is provided, said cleat being centrally apertured, slidingly mounted on said lever and slidingly supported atop said bight portion and providing a lever-angle regulating and maintaining chock.

3. The dolly defined in claim 1, and wherein said frame is constructed from several similarly formed angle irons, the rearward ends of said leg-forming angle irons being separable secured to coacting ends of the bight-forming angle iron, whereby said frame is knockdown in construction for compactness and convenience, and also wherein said handle is made of separable half-sections and embodies a yoke which is separably and pivotally mounted on said bight portion.

4. For expedient handling by a single workman, a dual vehicle wheel cradling, transporting and positioning dolly comprising, in combination, a manually maneuverable frame U-shaped in plan and embodying a pair of like coplanar spaced parallel angle irons constituting companion legs and having forward ends equipped with complemental free turning surface contacting rollers, a third angle iron interposed between the rearward ends of said first-named angle irons and separably fastened at its ends to said rearward ends, a surface contacting caster swivelly mounted on a median underneath part of said third angle iron, a push-pull handle having a yoke at its forward end pivotally and detachably joined to a median portion of said third angle iron, a first adapter plate carried by one of said legs and having an inward longitudinal edge on which minimal surface portions of the wheel tires are adapted to rest, a second adapter plate cooperating with said first adapter plate and carried by the other leg, said second adapter plate having an upper flat surface atop which tread portions of said tires are adapted to rest in a manner that the overall wheel assembly can be cradled for handling on said frame, said first adapter plate being adjustably mounted on said one leg and commensurate in length with said one leg, said inward longitudinal edge being shiftably adjustable toward and from the second adapter plate, the second adapter plate being equal in length to the length of the first adapter plate and also said other leg, and having an outward longitudinal edge which is hingedly supported and an inward longitudinal edge which is swingable vertically relative to the inward relatively fixed longitudinal edge of the first adapter plate, and a lifting and lowering lever whose longitudinal axis is disposed at right angles to the lengthwise dimension of said second adapter plate, said lever being parallel and proximal to said bight portion and having one end fixed to a rearward end portion of said second adapter plate and the other end free and provided with an accessible handgrip.

5. The dolly defined in and according to claim 4, and wherein a cleat is provided, said cleat being centrally apertured, slidingly mounted on said lever and slidingly supported atop said bight portion and providing a lever-angle regulating and maintaining chock.

6. The dolly defined in and according to claim 4 and, in combination, a centrally apertured cleat adjustably mounted on the free end portion of said lever and manually adjustable toward and from said handgrip, said cleat having a lower marginal edge shiftably but retentively supported atop a surface of said bight portion and providing a lever-angle adjusting and maintaining chock.

7. For ready use by a single workman, a dual wheel assembly cradling, transporting and handling dolly comprising a manually maneuverable frame shaped in plan and embodying a pair of spaced parallel coplanar companion legs having forward leading ends provided with opposed free turning surface contacting rollers and rearward ends joined together by a cooperating bight portion, a median part of said bight portion being provided on an underneath side with a swivelly mounted surface contacting caster oriented and coordinated with said rollers, a push-pull handle having a forward yoke hingedly operatively joined to said median part of said bight portion and a rearward end provided with conveniently usable handgrips, a first adapter plate, said plate being rectangular in plan, having flat surfaces, one flat surface being seated and adjustably and removably mounted atop one of said legs and having an inward longitudinal edge projecting and on which minimal surface portions of the wheels are adapted to rest, and a second adapter plate structurally similar to and normally located in a plane below the plane of the first adapter plate and cooperating therewith, said second adapter plate having a flat surface atop which tread portions of said wheels are adapted to rest in a manner that the overall wheel assembly can be cradled between said adapter plate for handling needs, said first adapter plate being commensurate in length with the length of said one leg, said inward longitudinal edge being shiftably adjustable toward and from said second adapter plate, said second adapter plate being equal in length to the length of said first adapter plate and also said other leg and having an outward longitudinal edge which is hingedly supported on said other leg and an inward longitudinal edge which is swingable vertically relative to the inward longitudinal edge of said first adapter plate, and a lifting and lowering lever disposed at right angles to the lengthwise dimension of said second adapter plate, said lever being parallel with and proximal to said bight portion and having one end fixed to a rearward end portion of said second adapter plate, the other end being free and provided with an accessible handgrip, and a cleat slidingly mounted on said lever forwardly of said handgrip and manually adjustable toward and from the handgrip and having a lower marginal edge shiftably but retentively supported atop a surface of said bight portion and constituting a lever-angle adjusting and maintaining chock.

* * * * *